(12) United States Patent
Kim et al.

(10) Patent No.: US 6,453,692 B1
(45) Date of Patent: Sep. 24, 2002

(54) METHOD FOR CONTROLLING REFRIGERATOR

(75) Inventors: Kyoung-tae Kim, Kwangju (KR); Hee-soo Lee, Kwangju (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/810,536

(22) Filed: Mar. 19, 2001

(30) Foreign Application Priority Data

Sep. 7, 2000 (KR) ............................................ 00-53119

(51) Int. Cl.$^7$ ............................................... F25B 49/02
(52) U.S. Cl. .............................. 62/229; 62/130; 62/157
(58) Field of Search ......................... 62/229, 157, 158, 62/228.1, 231, 126, 129, 130

(56) References Cited

U.S. PATENT DOCUMENTS

| | | | | |
|---|---|---|---|---|
| 2,257,801 A | * | 10/1941 | Hull .......................... | 62/229 X |
| 4,453,590 A | * | 6/1984 | Holliday et al. .......... | 62/157 X |
| 4,627,245 A | * | 12/1986 | Levine ........................ | 62/157 |
| 5,699,674 A | * | 12/1997 | Lee et al. ................. | 62/229 X |

FOREIGN PATENT DOCUMENTS

KR            70048            9/1999

* cited by examiner

*Primary Examiner*—Harry B. Tanner
(74) *Attorney, Agent, or Firm*—Robert E. Bushnell, Esq.

(57) ABSTRACT

A method for controlling a refrigerator constructed with a main body formed with a storage compartment accommodating therein food, a door opening and closing the storage compartment, a temperature sensor provided within the main body, by detecting a temperature of the main body, cooling is provided to the main body to cool the storage compartment in steps of establishing a control temperature of the temperature sensor to correspond to the temperature of the storage compartment; and continuously operating the cooling means until the temperature detected by the temperature sensor reaches the control temperature at an initial operation state. With this configuration, because the compressor is continuously operated until the temperature detected by the temperature sensor reaches the control temperature, the rate of cooling the stored food is enhanced and at the same time a desired storage temperature is achieved. In addition, the overload of the compressor may be prevented by limiting the continuous operation time of the compressor.

20 Claims, 6 Drawing Sheets

METHOD FOR CONTROLLING REFRIGERATOR

CLAIM OF PRIORITY

This application makes reference to, incorporates the same herein, and claims all benefits accruing under 35 U.S.C. §119 from my application REFRIGERATOR CONTROL METHOD filed with the Korean Industrial Property Office on Sep. 7, 2000 and there duly assigned Ser. No. 53119/2000.

BACKGROUND OF THE INVENTION

1. Field of the Invention

The present invention relates in general to methods for controlling refrigerators, and more particularly, to a method for controlling a refrigerator, capable of enhancing a cooling rate by continuously operating a compressor therein.

2. Description of Related Art

A refrigerator is generally comprised of a freezer compartment, a fresh food compartment, and a cooling system for cooling food therein. The freezer compartment has a low inner temperature and the fresh food compartment has an inner temperature higher than that of the former. The present invention will be described, by way of example, with reference to a kimchi (Korean pickled vegetables) refrigerator having a main body having two storage compartments, a heater heating the storage compartments, and a cooling system cooling the storage compartments.

The cooling system of the kimchi refrigerator is comprised of a compressor compressing a refrigerant, an evaporator cooling the storage compartments by means of the refrigerant from the compressor, and a refrigerant pipe supplying the refrigerant compressed by the compressor into the evaporator. On the refrigerant pipe supplying the refrigerant is installed a control valve which can control the amount of the refrigerant according to the operating conditions of the storage compartments. The kimchi refrigerator is provided with a temperature sensor sensing an inner temperature of the respective storage compartments, a manipulating part whereby the operational conditions for each compartment are inputted, and a controller controlling the compressor, the evaporator and the valve according to the temperature sensed by the temperature sensor.

FIG. 8 is a temperature graph for a conventional kimchi refrigerator. Referring to FIG. 8, after the refrigerator starts to operate according to preset initial operating conditions, and the is compressor (not shown) is continuously operated for a predetermined time, a continuous operation a of the compressor is suspended; and in lieu thereof, the compressor starts to operate based on a normal operation mode. The normal operation mode refers to a mode under which periodical on and off operations of the compressor are repeated at regular intervals of time.

In the conventional kimchi refrigerator, however, since the temperature sensor is installed adjacent to the evaporator, the temperature detected by the temperature sensor reaches the control temperature before a temperature of the food stored in the storage compartments reaches the desired temperature, and accordingly the compressor suspends its operation. As a result, initial cooling of the food stored in the storage compartments is delayed, thereby decreasing the efficiency of cooling.

SUMMARY OF THE INVENTION

Accordingly, the present invention has been made in view of the above-described shortcomings, and it is an object of the present invention to provide a method controlling a refrigerator which is capable of enhancing a cooling rate of the stored food and at the same time achieving a desired storage temperature, thereby improving the cooling efficiency.

This and other objects of the present invention maybe achieved by a provision of a method for controlling a refrigerator comprising a main body formed with a storage compartment accommodating food therein, a door opening and closing the storage compartment, a temperature sensor provided within the main body, detecting a temperature thereof, and a cooling means provided in the main body, cooling the storage compartment, the method comprising the steps of establishing a control temperature of the temperature sensor to correspond to the temperature of the storage compartment; and continuously operating the cooling means until the temperature detected by the temperature sensor reaches the control temperature at an initial operation state.

The cooling means is preferably comprised of a compressor.

Effectively, the method further comprises the step of driving the compressor according to an established cycle after the detected temperature of the temperature sensor reaches the control temperature.

More effectively, the method further comprises the steps of establishing a maximum protection temperature which is higher than the control temperature; and continuously operating the compressor until the temperature detected by the temperature sensor reaches the maximum protection temperature, when the detected temperature is higher than the maximum protection temperature.

Still effectively, the method further comprises the steps of establishing a minimum protection temperature which is lower than the control temperature; and suspending the compressor until the detected temperature reaches the control temperature, when the detected temperature of the temperature sensor is lower than the minimum protection temperature.

Preferably, the method further comprises the steps of counting a continuous operation time of the compressor using a counter at an initial operation state; and suspending the continuous operation of the compressor where the continuous operation time counted by the counter reaches a predetermined time.

Also preferably, the method further comprises the step of operating the compressor according to an established cycle if the temperature detected by the temperature sensor reaches the control temperature, after the continuous operation of the compressor is suspended.

Effectively, the method further comprises the step of operating the compressor according to an established cycle if the temperature detected by the temperature sensor reaches the control temperature, after the continuous operation of the compressor is suspended.

Preferably, the method further comprises the step of continuously operating the compressor until the detected temperature reaches the control temperature after operating the compressor according to an established cycle for a predetermined time, if the detected temperature does not reach the control temperature after the continuous operation of the compressor is suspended.

As an alternative, the method further comprises the step of continuously operating the compressor until the detected temperature reaches the control temperature after suspending the compressor for a predetermined time, if the detected temperature does not reach the control temperature after the continuous operation of the compressor is suspended.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
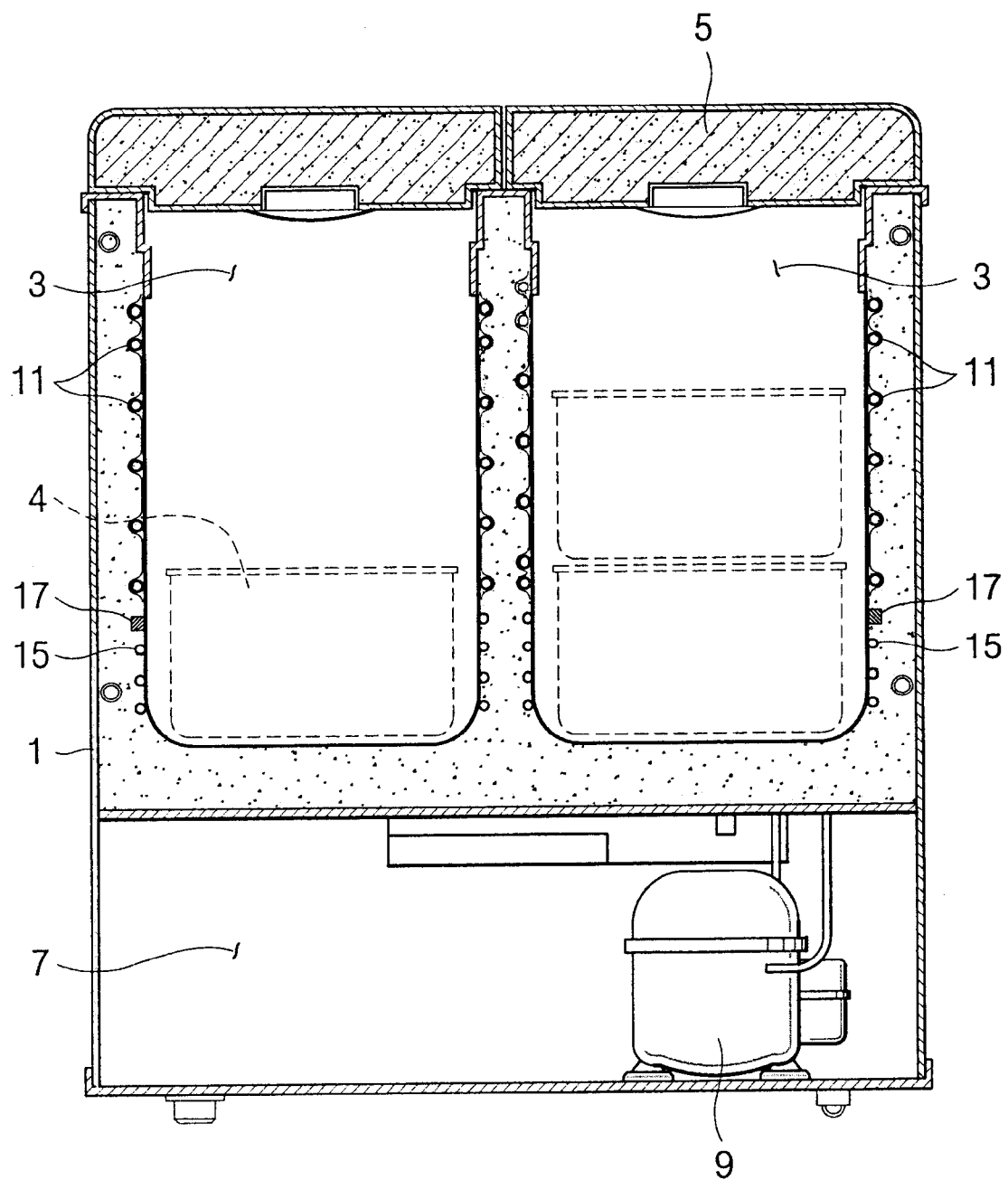
FIG. 1 is a side sectional view of a kimchi refrigerator according to the present invention.
Figure 2:
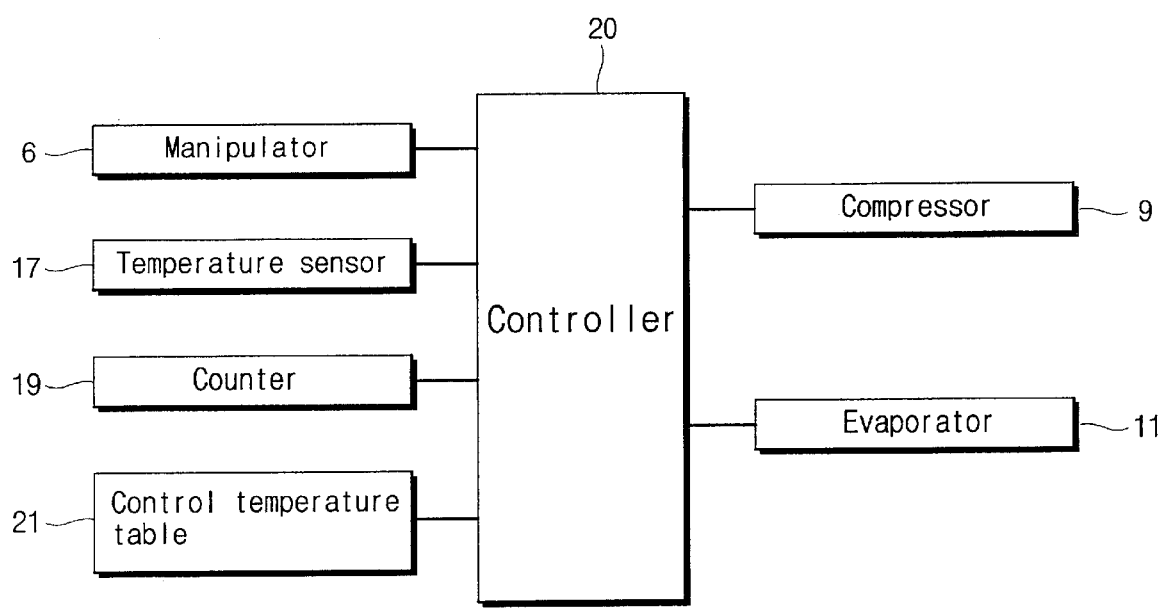
FIG. 2 is a control block diagram of the kimchi refrigerator of FIG. 1.

Referring to FIGS. 1 and 2, a refrigerator according to the present invention is comprised of a main body formed with a pair of storage compartments 3, having their respective openings, and a pair of doors 5 opening and closing the openings of the main body 1. On the front top of the main body 1 is installed a manipulator 6 with which a ripeness time and a storage time, etc. are selected according to the kind of food 4 stored in the storage compartments 3. The main body 1 of the kimchi refrigerator is comprised of a cooling system cooling the storage compartments and a heater 15 heating the storage compartments 3. The cooling system is installed within a component chamber 7 provided between the lower part of the main body 1 and the bottoms of the storage compartments 3.

The cooling system is comprised of a compressor 9 compressing a refrigerant, an evaporator 11 generating cool air by means of the refrigerant compressed by the compressor 9, and a refrigerant tube (not shown) transmitting the compressed refrigerant from the compressor 9 into the evaporator 11. On the refrigerant tube is provided a control valve 13 (see FIG. 2) controlling the amount of the refrigerant from the compressor 9 according to cooling conditions of the storage compartments 3.

The main body 1 is provided with a temperature sensor 17 sensing a temperature of a position adjacent to the storage compartments 3, a counter 19 counting an operation time of the compressor 9, a control temperature table 21 having a control temperature of the temperature sensor 17 established to correspond to a desired temperature of the storage compartments 3. The main body 1 is further comprised of a controller 20 (see FIG. 2) controlling an operation of the compressor 9 according to either of the temperature sensed by the temperature sensor 17 or the continuous operation time of the compressor 9 counted by the counter 19. The control temperature table 21 has a maximum protection temperature I and a minimum protection temperature II. The maximum protection temperature I is established higher than a control temperature corresponding to the desired temperature of the storage compartments 3, and the minimum protection temperature II is established to be lower than the control temperature.

Figure 3:
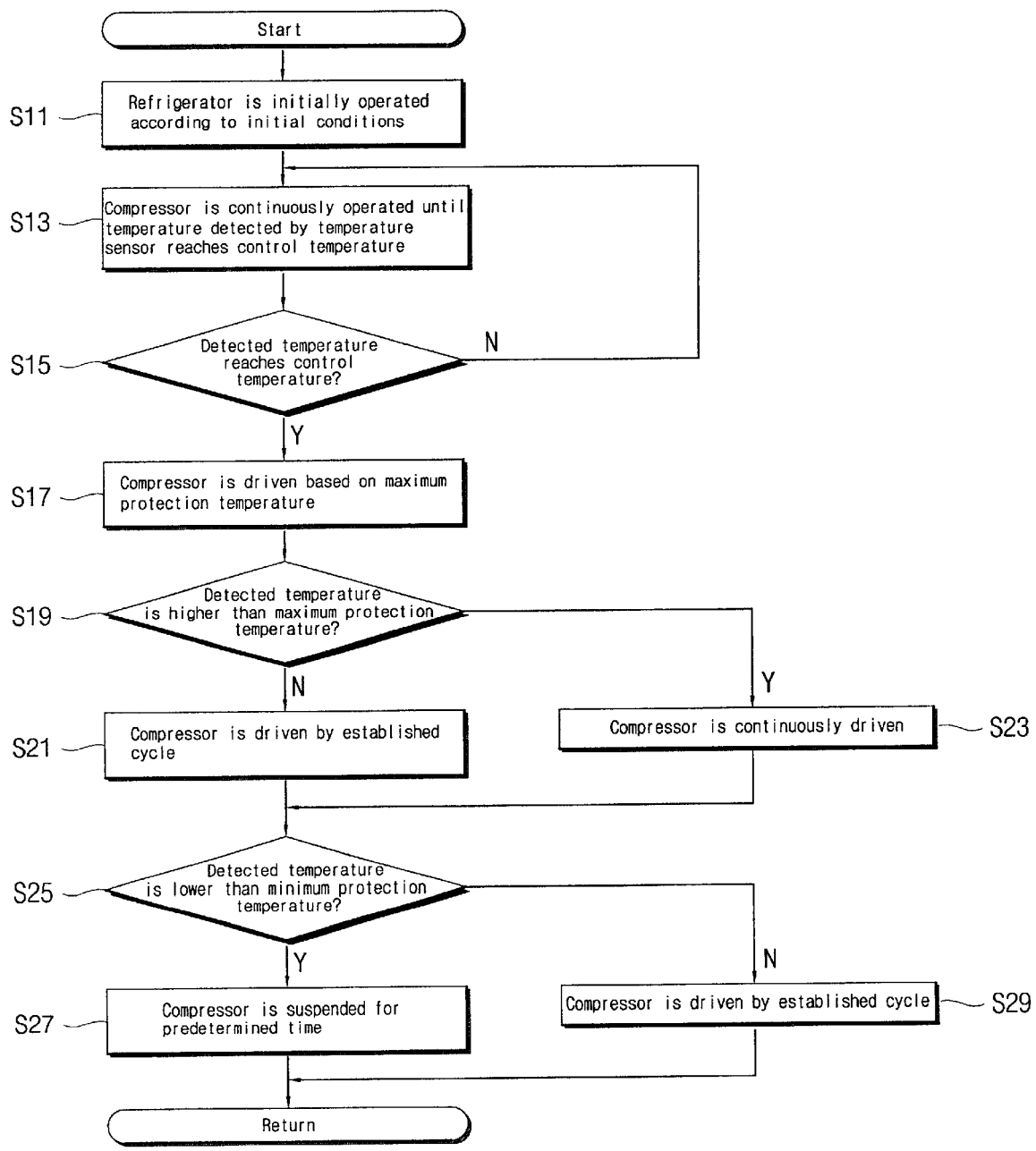
FIG. 3 is a control flow diagram of the kimchi refrigerator of FIG. 1.
Figure 4:
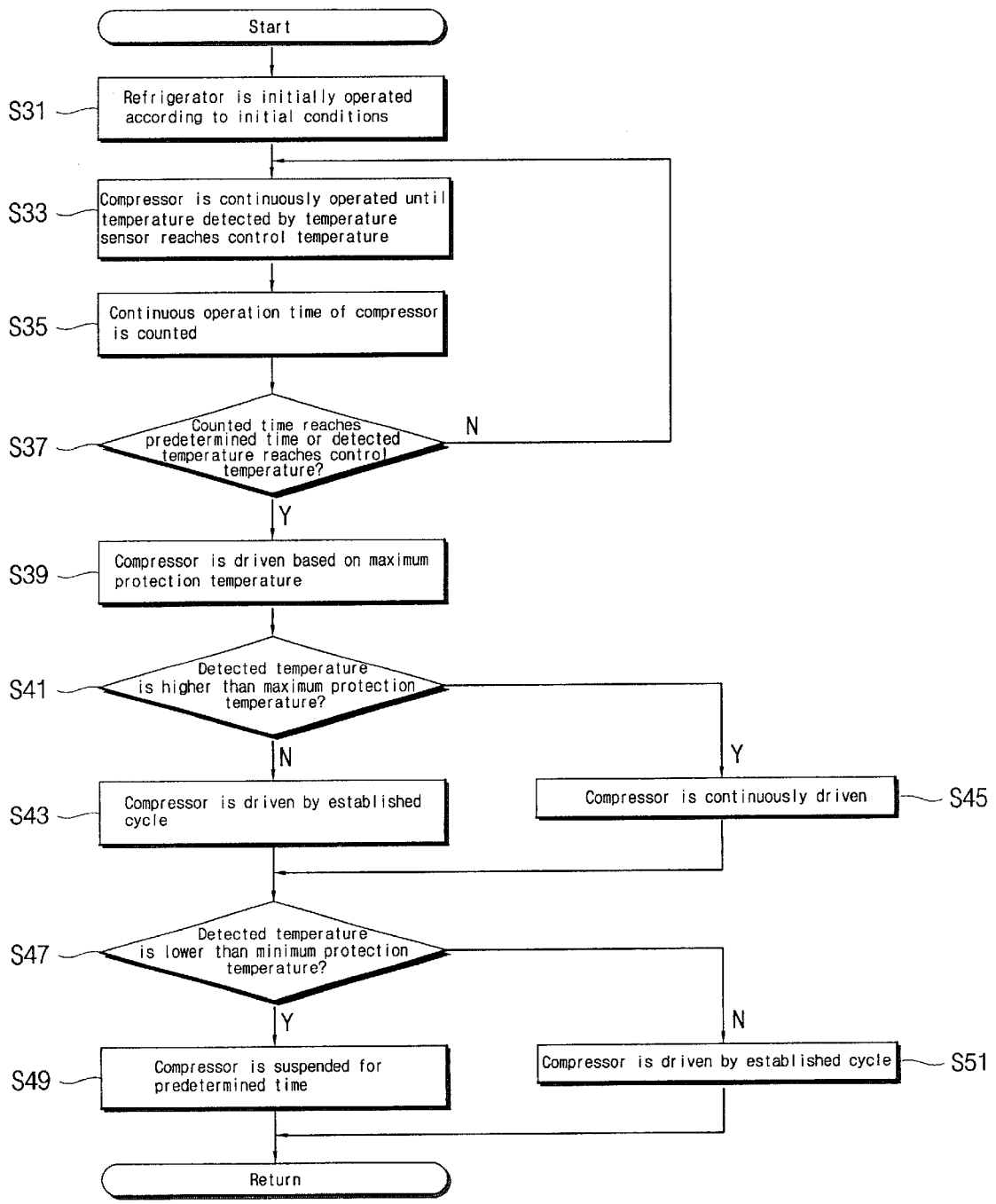
FIG. 4 is a control flow diagram of the kimchi refrigerator according to another embodiment of the present invention.

Referring to FIGS. 3 and 4, when an electric power is supplied to the kimchi refrigerator, the refrigerator initiates its operation according to initial operating conditions inputted through the manipulator 6, considering the kind of stored food 4 and the degree of ripeness, etc. (S11).

Once the refrigerator initiates its operation according to the initial operating conditions, the controller 20 continuously drives the compressor 9 until a temperature detected by the temperature sensor 17 reaches the control temperature stored in the control temperature table 21 (S13). The controller 20 determines whether the detected temperature of the temperature sensor 17 reaches the control temperature while the compressor 9 is in continuous operation (S15). If it is determined that the detected temperature of the temperature sensor 17 reaches the control temperature, the controller 20 drives the compressor 9 based on the maximum protection temperature (S17).

When the compressor 9 is operated according to the maximum protection temperature I, the controller 20 determines whether the detected temperature of the temperature sensor 17 is higher than the maximum protection temperature I (S19). If it is determined that the detected temperature of the temperature sensor 17 is not higher than the maximum protection temperature I, the controller 20 drives the compressor 9 according to an established cycle (S21) under a normal operation mode. Contrarily, if it is determined that the detected temperature of the temperature sensor 17 is higher than the maximum protection temperature I, the controller 20 continuously drives the compressor 9 (S23).

The controller 20 determines whether the detected temperature of the temperature sensor 17 is lower than the minimum protection temperature II (S25). If the detected temperature of the temperature sensor 17 is lower than the minimum protection temperature II, the controller controls the compressor 9 to suspend its operation for a predetermined time or until reaching the control temperature, thereby preventing overcooling (S27). If the control temperature is not lower than the minimum protection temperature II, the controller 20 drives the compressor 9 according to an established cycle (S29).

Referring to FIG. 4, the present invention will be described in more detail. For the sake of convenience, the description of the same parts as those of FIG. 3 will be omitted. As shown, the refrigerator initiates its operation based on the initial conditions inputted through the manipulator 6 (S31). If the refrigerator is operated according to the initial conditions, the controller 20 continuously drives the compressor 9 until a temperature detected by the temperature sensor 17 reaches a control temperature stored in the control temperature table 21 (S33).

If the compressor 9 is continuously operated, the controller 20 counts the continuous operation time of the compressor 9 through the counter 19 (S35). The controller 20 determines whether the counted time reaches a predetermined time or the temperature detected by the temperature sensor 17 reaches a predetermined control temperature (S37). If it is determined that the counted time reaches the predetermined time or the detected temperature of the temperature sensor 17 reaches a predetermined control temperature, the controller 20 controls the operation of the compressor 9 based on the maximum protection temperature I (S39).

When the compressor 9 is driven based on the maximum protection temperature I, the steps similar to S19 through S29 of FIG. 3 are similarly conducted. That is, depending upon whether the detected temperature is higher than the maximum protection temperature I or not, the steps (S47, S49 and S51) to control the operation of the compressor 9 are conducted. Depending upon whether the detected temperature is lower than the minimum protection temperature II or not, the steps (S49 and S51) to control the operation of the compressor 9 are conducted.

Hereinbelow, referring to FIGS. 5 through 7, a temperature of the storage compartments and a detected temperature of the temperature sensor will be described in detail.

Figure 5:
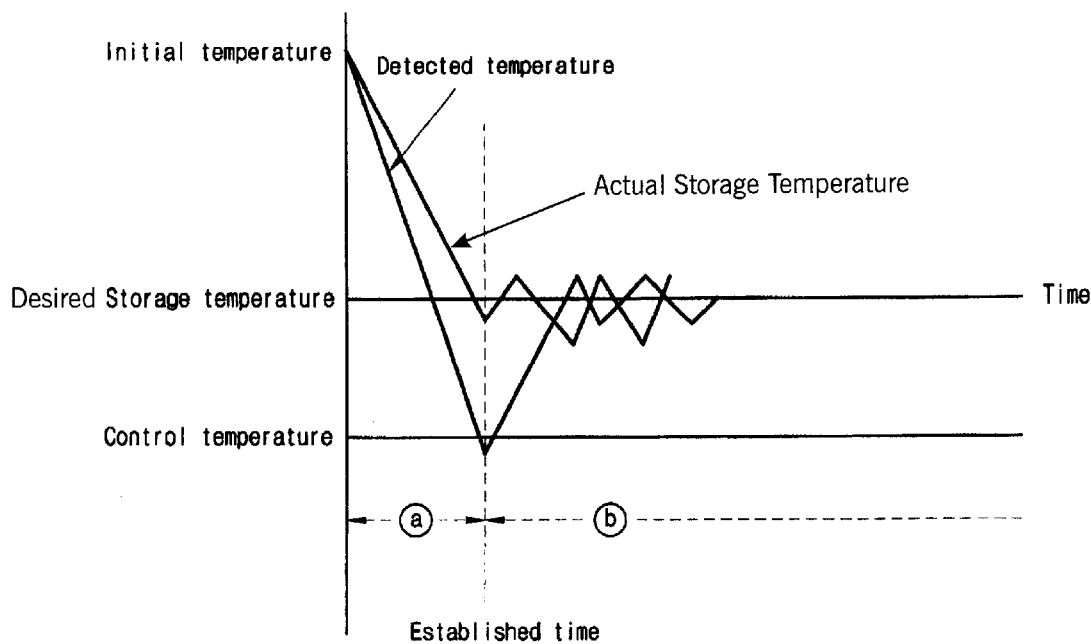
FIGS. 5 through 7 are temperature graphs of the kimchi refrigerator according to the present invention.

As shown in FIG. 5, the compressor 9 is continuously driven until a temperature detected by the temperature sensor 17 reaches the control temperature (section (a)). Because the compressor 9 is continuously driven until the detected temperature of the temperature sensor 17 reaches the control temperature, the temperature sensor quickly reaches the control temperature desired for the go stored food 4 in the storage compartments 3 from the initial operation. If the detected temperature of the temperature sensor 17 reaches the control temperature, the compressor 9 is driven according to the established cycle (section (b)), thereby preventing the stored food 4 from being overcooled. By setting up the minimum protection temperature I (not shown), the overcooling maybe prevented.

Figure 6:
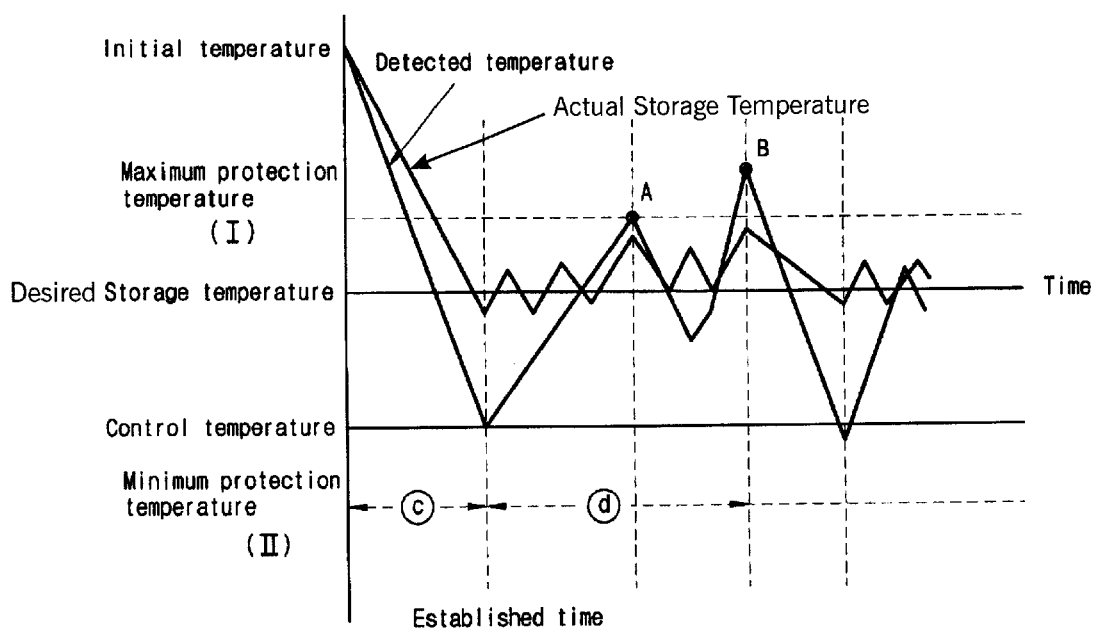

Referring to FIG. 6, if the kimchi refrigerator starts to operate according to the initial conditions, the compressor 9 is continuously driven until the temperature detected by the temperature sensor 17 reaches the control temperature (section c). While the compressor 9 is in continuous operation, the continuous operation time is counted. If it is determined that the counted continuous operation time reaches the predetermined time, the compressor 9 suspends its continuous operation and is driven according to the established cycle (section d), in order to prevent the compressor from being overloaded. If, as a result of the continuous operation of compressor 9 the temperature detected by the temperature sensor 17 reaches the control temperature before the counted continuous operation time reaches the predetermined time, the controller 20 controls the temperature sensor 17 based on the maximum protection temperature I and the minimum protection temperature II.

Referring to FIG. 6, after the detected temperature of the temperature sensor 17 reaches the control temperature owing to the continuous operation of the compressor 9, the compressor 9 is driven according to the established cycle until the temperature detected by sensor 17 reaches the maximum protection temperature I (point A). Where the control temperature is higher than the maximum protection temperature II (point B), the compressor 9 is driven to continuously operate until the detected temperature reaches the control temperature, to thereby lower the temperature. The control temperature may reach point A and point B, when additional food is put into the storage compartments 3 or where an operating mode is changed from a ripeness mode to a storage mode.

Figure 7:
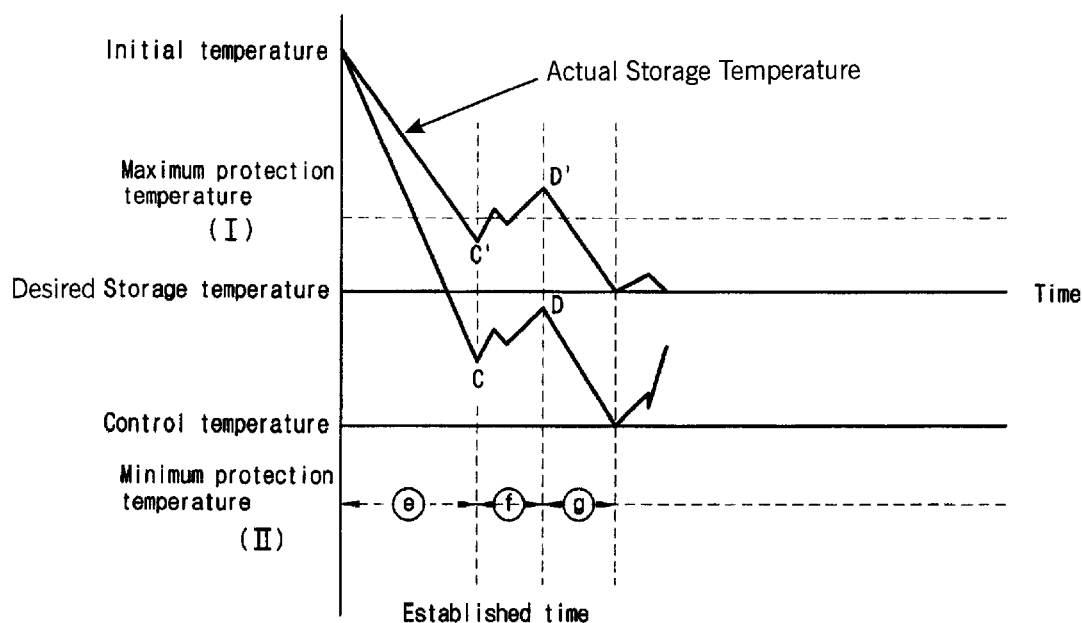
Figure 8:
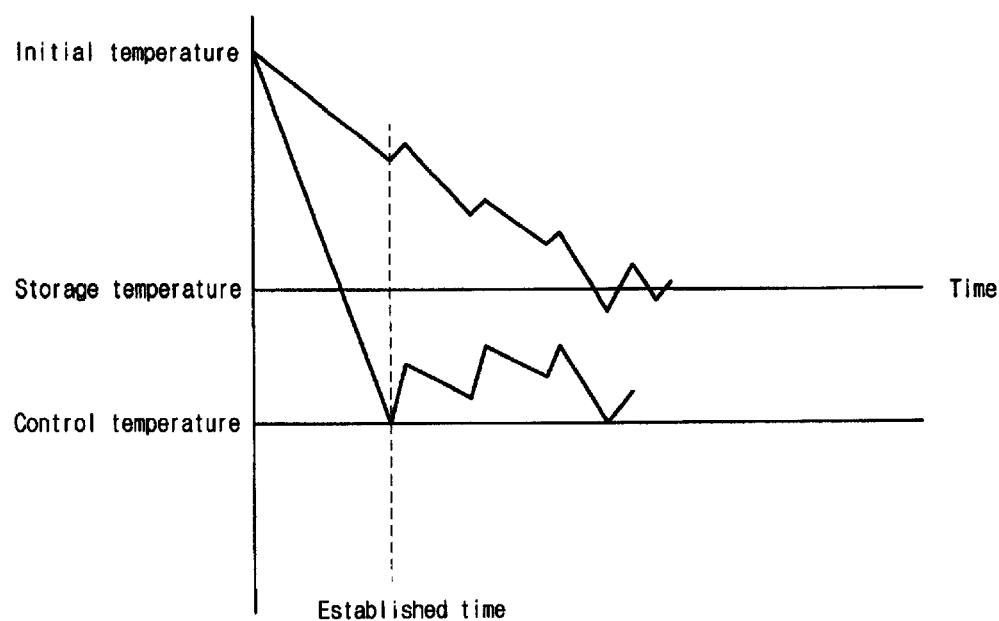
FIG. 8 is a temperature graph of a conventional kimchi refrigerator.

FIG. 7 shows a change in temperature where the detected temperature of the temperature sensor does not reach the desired control temperature when the continuous operation time of the compressor 9 has reached the predetermined time.

If it is determined that the continuous operation time of the compressor 9 counted by the counter 19 has passed the predetermined time after the compressor has continuously operated (section e), the compressor 9 is operated based on the established cycle (section f) for a predetermined time, in order to prevent the compressor from being overloaded. Since it is determined that the temperature detected by the temperature sensor 17 at point C does not reach the control temperature, the compressor 9 is resumed to continuously operate until the detected temperature of the temperature sensor 17 reaches the control temperature (section g).

FIG. 7 illustrates that the compressor 9 is operated according to the established cycle and then continuously operated, in order to prevent the compressor from being overloaded in the section of (f). However, an operation of the compressor 9 is suspended for a predetermined time in the section of (f), and then it is continuously operated again after the predetermined time has passed.

As described above, the rate of cooling the stored food is enhanced and the efficiency of storage is improved, by the steps of establishing the control temperature of the temperature sensor to correspond to a desired temperature of the storage compartment and continuously operating the compressor until the temperature detected by the temperature sensor 17 reaches the control temperature. In addition, overload of the compressor may be prevented by limiting the continuous operational time of the compressor.

According to the present invention, because the compressor is continuously operated until the temperature detected by the temperature sensor reaches the control temperature, the rate of cooling the stored food is enhanced and at the same time a desired storage temperature is achieved, and the overload of the compressor may be prevented by limiting the continuous operation time of the compressor.

Especially, even when additional stored food is put into the storage compartment or the mode thereof is changed to the ripeness mode from the storage mode during an initial operation of the refrigerator or during a storage operation thereof, the cooling rate can be efficiently increased.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a refrigerator comprising a main body formed with a storage compartment accommodating food therein, a door opening and closing the storage compartment, a temperature sensor provided within the main body, detecting a temperature thereof, and a cooling means provided in the main body, cooling the storage compartment, comprising the steps of:

establishing a control temperature which is lower than a temperature of the storage compartment;

continuously operating the cooling means until the temperature detected by the temperature sensor reaches the control temperature at an initial operation state;

driving the cooling means according to an established cycle after the detected temperature of the temperature sensor reaches the control temperature; and establishing a maximum protection temperature which is higher than the control temperature.

2. The method according to claim 1, wherein the cooling means is comprised of a compressor.

3. The method according to claim 2, further comprising the steps of continuously operating the compressor until the temperature detected by the temperature sensor reaches the maximum protection temperature, when the detected temperature is higher than the maximum protection temperature.

4. The method according to claim 3, further comprising the steps of establishing a minimum protection temperature which is lower than the control temperature; and suspending the compressor until the detected temperature reaches the control temperature, when the detected temperature of the temperature sensor is lower than the minimum protection temperature.

5. The method according to claim 4, further comprising the step of driving the compressor according to an established cycle after the detected temperature of the temperature sensor reaches the control temperature.

6. The method according to claim 3, further comprising the step of driving the compressor according to an established cycle after the detected temperature of the temperature sensor reaches the control temperature.

7. The method according to claim 2, further comprising the steps of:

establishing a minimum protection temperature which is lower than the control temperature; and suspending operation of the compressor until the detected temperature reaches the control temperature, when the detected temperature of the temperature sensor is lower than the minimum protection temperature.

8. The method according to claim 7, further comprising the step of driving the compressor according to an established cycle after the detected temperature of the temperature sensor reaches the control temperature.

9. The method according to claim 2, further comprising the steps of:

counting a continuous operational time of the compressor using a counter at an initial operation state; and suspending the continuous operation of the compressor where the continuous operational time counted by the counter reaches a predetermined time.

10. The method according to claim 9, further comprising the step of operating the compressor according to an established cycle if the temperature detected by the temperature sensor reaches the control temperature, after the continuous operation of the compressor is suspended.

11. The method according to claim 9, further comprising the step of continuously operating the compressor until the detected temperature reaches the control temperature after operating the compressor according to an established cycle for a predetermined time, if the detection temperature does not reach the control temperature after the continuous operation of the compressor is suspended.

12. The method according to claim 10, further comprising the step of continuously operating the compressor until the detected temperature reaches the control temperature after suspending the compressor for a predetermined time, if the detected temperature does not reach the control temperature after the continuous operation of the compressor is suspended.

13. A method for controlling a refrigerator comprising a main body formed with a storage compartment accommodating food therein, a door opening and closing the storage compartment, a temperature sensor provided within the main body, detecting a temperature thereof, and a cooling means provided in the main body, cooling the storage compartment, comprising the steps of:

establishing a control temperature which is lower than a temperature of the storage compartment;

continuously operating the cooling means for an established time at an initial operation state;

driving the cooling means according to an established cycle after the detected temperature of the temperature sensor reaches the control temperature; and establishing a maximum protection temperature which is higher than the control temperature.

14. The method according to claim 13, wherein the cooling means is comprised of a compressor.

15. The method according to claim 14, further comprising the steps of:

counting a continuous operational time of the compressor using a counter at an initial operation state; and suspending the continuous operation of the compressor where the continuous operational time counted by the counter reaches a predetermined time.

16. The method according to claims 14, further comprising the step of operating the compressor according to an established cycle if the temperature detected by the temperature sensor reaches the control temperature, after the continuous operation of the compressor is suspended.

17. The method according to claim 14, further comprising the step of continuously operating the compressor until the detected temperature reaches the control temperature after operating the compressor according to an established cycle for a predetermined time, if the detection temperature does not reach the control temperature after the continuous operation of the compressor is suspended.

18. The method according to claim 16, further comprising the step of continuously operating the compressor until the detected temperature reaches the control temperature after suspending the compressor for a predetermined time, if the detected temperature does not reach the control temperature after the continuous operation of the compressor is suspended.

19. A method for controlling a refrigerator comprising a main body formed with a storage compartment accommodating food therein, a door opening and closing the storage compartment, a temperature sensor provided within the main body, detecting a temperature thereof, and a cooling means provided in the main body, cooling the storage compartment, comprising the steps of:

establishing a control temperature which is lower than a temperature of the storage compartment;

continuously operating the cooling means until a counted continuous operational time reaches a predetermined time or until the temperature detected by the temperature sensor reaches the control temperature at an initial operation state;

driving the cooling means according to an established cycle after the detected temperature of the temperature sensor reaches the control temperature; and establishing a maximum protection temperature which is higher than the control temperature.

20. The method according to claim 19, wherein the cooling means is comprised of a compressor.

* * * * *